US012363289B2

(12) United States Patent
Teng et al.

(10) Patent No.: US 12,363,289 B2
(45) Date of Patent: Jul. 15, 2025

(54) DEVICE AND METHOD FOR DECODING VIDEO DATA

(71) Applicant: SHARP KABUSHIKI KAISHA, Sakai (JP)

(72) Inventors: Chih-Yu Teng, Taipei (TW); Yu-Chiao Yang, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 266 days.

(21) Appl. No.: 18/091,649

(22) Filed: Dec. 30, 2022

(65) Prior Publication Data

US 2023/0217019 A1    Jul. 6, 2023

Related U.S. Application Data

(60) Provisional application No. 63/266,404, filed on Jan. 4, 2022.

(51) Int. Cl.
*H01L 29/94* (2006.01)
*H04N 19/11* (2014.01)
*H04N 19/176* (2014.01)

(52) U.S. Cl.
CPC .......... *H04N 19/11* (2014.11); *H04N 19/176* (2014.11)

(58) Field of Classification Search
CPC .... H04N 19/11; H04N 19/176; H04N 19/154; H04N 19/46; H04N 19/593; H04N 19/44;
(Continued)

(56) References Cited

U.S. PATENT DOCUMENTS 11,470,317 B2 * 10/2022 Lee ...................... H04N 19/176
2003/0108099 A1 * 6/2003 Nagumo ................ G06T 9/20
375/E7.199
(Continued)

FOREIGN PATENT DOCUMENTS

WO      2019103542 A1    5/2019

OTHER PUBLICATIONS

Output Document of JVET, "Algorithm description for Versatile Video Coding and Test Model 15 (VTM15)", Document: JVET-X2002-v1, Joint Video Experts Team (JVET) of ITU-T SG 16 WP 3 and ISO/IEC JTC 1/SC 29, 24th Meeting, by teleconference, Oct. 6-15, 2021.
(Continued)

*Primary Examiner* — Joseph Suh
(74) *Attorney, Agent, or Firm* — ScienBiziP, P.C.

(57) ABSTRACT

A method of decoding video data by an electronic device is provided. The electronic device determines a block unit from an image frame according to the video data. The electronic device determines, for the block unit, a first mode list including intra candidate modes selected from intra default modes, and predicts at least one template region adjacent to the block unit to generate template predictions based on intra template modes. Each of the intra template modes indicates one of the intra candidate modes and one of template reference lines, and the template reference lines include at least one template neighboring line nonadjacent to the at least one template region. The electronic device determines a template cost value between the at least one template region and each of the template predictions, and reconstructs the block unit based on a second mode list determined based on the template cost values.

16 Claims, 6 Drawing Sheets

(58) Field of Classification Search
CPC .. H04N 19/107; H04N 19/117; H04N 19/124; H04N 19/147; H04N 19/18; H04N 19/42; H04N 19/503; H04N 19/61; H04N 19/80; H04N 19/91
See application file for complete search history.

(56) References Cited

U.S. PATENT DOCUMENTS

| | | | |
|---|---|---|---|
| 2015/0245068 A1* | 8/2015 | Kim | H04N 19/176 375/240.12 |
| 2017/0339404 A1* | 11/2017 | Panusopone | H04N 19/647 |
| 2018/0146191 A1* | 5/2018 | Jiang | H04N 19/11 |
| 2020/0021806 A1* | 1/2020 | Kim | H04N 19/11 |
| 2022/0224913 A1* | 7/2022 | Wang | H04N 19/593 |

OTHER PUBLICATIONS

Output Document of JVET, "Algorithm description of Enhanced Compression Model 3 (ECM 3)", Document: JVET-X2025, Joint Video Experts Team (JVET) of ITU-T SG 16 WP 3 and ISO/IEC JTC 1/SC 29, 23rd Meeting, by teleconference, Jul. 7-16, 2021.
Telecommunication Standardization Sector of ITU, "High efficiency video coding", Rec. ITU-T H.265 v5 (Feb. 2018), Series H: Audiovisual and Multimedia Systems Infrastructure of audiovisual services—Coding of moving video.
Telecommunication Standardization Sector of ITU, "Versatile video coding", Rec. ITU-T H.266 (Aug. 2020), Series H: Audiovisual and Multimedia Systems Infrastructure of audiovisual services—Coding of moving video.
Kerning Cao et al: "EE2-related: Templated based intra most probable modes sorting", Joint Video Experts Team (JVET) of ITU-T SG 16 WP 3 and ISO/IEC JTC 1/SC 29 23rd Meeting, by teleconference, Jul. 7-16, 2021, JVET-W0124-v1, Section 2.
Taichiro Shiodera et al: "TE6 subset a: Bidirectional intra prediction", Joint Collaborative Team on Video Coding (JCT-VC) of ITU-T SG16 WP3 and ISO/IEC JTC1/SC29/WG11 3rd Meeting: Guangzhou, CN, Oct. 7-15, 2010, JCTVC-C079, Section 1.3.
Luhang Xu et al: "EE2-1.10: Template-based multiple reference line intra prediction", Joint Video Experts Team (JVET) of ITU-T SG 16 WP 3 and ISO/IEC JTC 1/SC 29 28th Meeting, Mainz, DE, Oct. 20-28, 2022, JVET-AB0156-v1, Section 1; Figure 1.
Kerning Cao et al: "Non-EE2: Extended MRL candidate list", Joint Video Experts Team (JVET) of ITU-T SG 16 WP 3 and ISO/IEC JTC 1/SC 29 24th Meeting, by teleconference, Oct. 6-15, 2021, JVET-X0142-v3, Section 2.
Keming Cao et al., "EE2-related: Template-based intra most probable modes sorting", JVET-W0124-v3, Joint Video Experts Team (JVET) of ITU-T SG 16 WP 3 and ISO/IEC JTC 1/SC 29, 23rd Meeting, by teleconference, Jul. 7-16, 2021 (Jul. 12, 2021).

* cited by examiner

DEVICE AND METHOD FOR DECODING VIDEO DATA

CROSS-REFERENCE TO RELATED APPLICATION(S)

The present disclosure claims the benefit of and priority to U.S. Provisional Patent Application Ser. No. 63/266,404, filed on Jan. 4, 2022, entitled "TEMPLATE-BASED INTRA CANDIDATE LIST DERIVATION," the content of which is hereby fully incorporated by reference into the present disclosure.

FIELD

The present disclosure is generally related to video coding and, more specifically, to techniques for using template predictions in template-based intra candidate list derivation.

BACKGROUND

Most probable mode (MPM) list is a coding tool for video coding. In a conventional video coding method, an encoder and a decoder may determine intra neighboring modes used to predict a plurality of neighboring blocks neighboring a target block for generating the MPM list including a plurality of most probable modes (MPMs) for predicting the target block.

However, the order of the MPM modes in the MPM list and the order of the non-MPM list is predefined without adjusting based on any neighboring information. Since the number of bits for the last one of the MPMs is greater than the number of bits for the first one of the MPMs, the number of bits will increase if the last one of the MPMs for each block in an image frame is always selected. Thus, the coding efficiency may decrease. Therefore, the encoder and the decoder may need a new intra candidate list derivation for predicting or reconstructing the target block more precisely.

SUMMARY

The present disclosure is directed to a device and method for predicting a block unit in an image frame by using template predictions.

In a first aspect of the present disclosure, a method of decoding video data and an electronic device for performing the method are provided. The method includes receiving the video data; determining a block unit from an image frame according to the video data; determining, for the block unit, a first mode list including a plurality of intra candidate modes selected from a plurality of intra default modes; determining at least one template region adjacent to the block unit; predicting the at least one template region to generate a plurality of template predictions based on a plurality of intra template modes, wherein: each of the plurality of intra template modes indicates one of the plurality of intra candidate modes and one of a plurality of template reference lines, and the plurality of template reference lines includes at least one template neighboring line nonadjacent to the at least one template region; determining a plurality of template cost values, each of the plurality of template cost values comprising a template cost value between the at least one template region and a corresponding one of the plurality of template predictions; determining, for the block unit, a second mode list based on the plurality of template cost values; and reconstructing the block unit based on the second mode list.

In an implementation of the first aspect, determining, for the block unit, the first mode list includes determining a plurality of neighboring blocks neighboring the block unit; determining at least one intra neighboring mode of the plurality of neighboring blocks, wherein each of the plurality of neighboring blocks is reconstructed based on one of the at least one intra neighboring mode; and selecting the plurality of intra candidate modes from the plurality of intra default modes based on the at least one intra neighboring mode to generate the first mode list of the block unit.

In another implementation of the first aspect, the plurality of intra candidate modes is a plurality of most probable modes (MPMs) determined based on the at least one intra neighboring mode.

In another implementation of the first aspect, the at least one template region comprises at least one of an above adjacent region located above the block unit, a left adjacent region located to a left side of the block unit, or an above-left adjacent region located to a top-left side of the block unit.

In another implementation of the first aspect, the plurality of template reference lines further comprises a template adjacent line adjacent to the at least one template region.

In an implementation of the first aspect, determining, for the block unit, the second mode list includes determining an arrangement of the plurality of intra template modes based on the plurality of template cost values; and determining the second mode list based on the arrangement.

In another implementation of the first aspect, the arrangement is generated by ordering the plurality of intra template modes in an ascending order of the plurality of template cost values.

In another implementation of the first aspect, the second mode list comprises a first K of the plurality of intra candidate modes ordered based on the arrangements, and K is a positive integer less than a number of the plurality of intra candidate modes in the first mode list.

In another implementation of the first aspect, the template cost value for each of the plurality of template predictions is a template-matching cost value determined by comparing a plurality of reconstructed samples in the at least one template region with a plurality of predicted samples in one of the plurality of template predictions.

In another implementation of the first aspect, a template prediction mode is determined, based on a template mode index included in the video data, from the second mode list to reconstruct the block unit.

In another implementation of the first aspect, the template prediction mode indicates a specific one of the plurality of intra candidate modes and a specific one of the plurality of template reference lines selected for the block unit, the specific one of the plurality of template reference lines is selected based on a reference line index of the block unit included in the video data, and the specific one of the plurality of intra candidate modes is determined, based on the template mode index, from the second mode list after determining the specific one of the plurality of template reference lines.

BRIEF DESCRIPTION OF THE DRAWINGS

Aspects of the present disclosure are best understood from the following detailed disclosure and the corresponding figures. Various features are not drawn to scale and dimensions of various features may be arbitrarily increased or reduced for clarity of discussion.

DESCRIPTION

Figure 1:
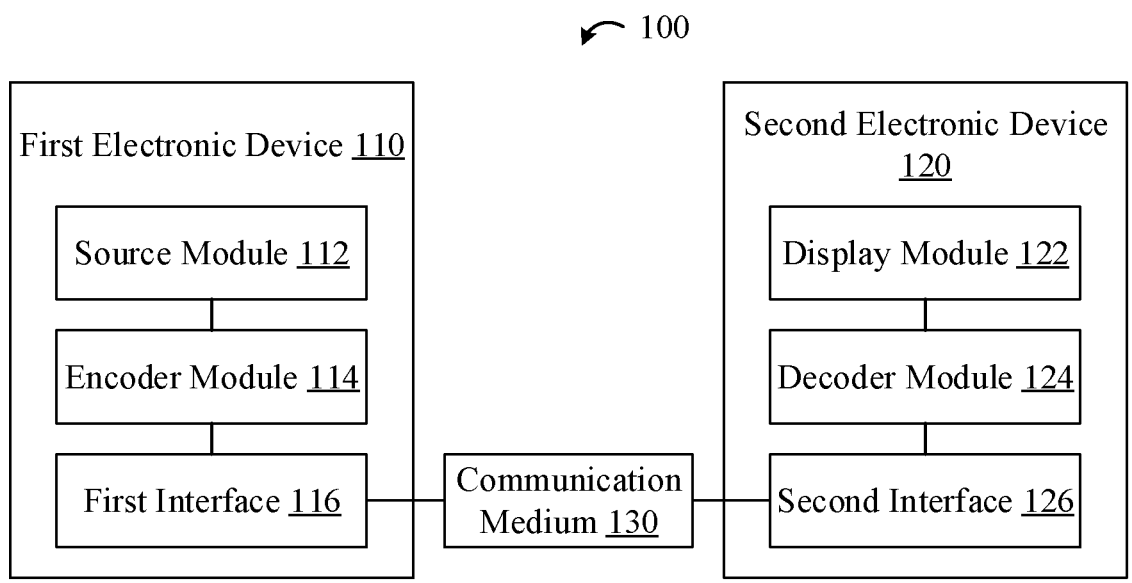
FIG. 1 illustrates a block diagram of a system configured to encode and decode video data according to an implementation of the present disclosure.

The following disclosure contains specific information pertaining to implementations in the present disclosure. The figures and the corresponding detailed disclosure are directed to example implementations. However, the present disclosure is not limited to these example implementations. Other variations and implementations of the present disclosure will occur to those skilled in the art.

Unless noted otherwise, like or corresponding elements among the figures may be indicated by like or corresponding reference designators. The figures and illustrations in the present disclosure are generally not to scale and are not intended to correspond to actual relative dimensions.

For the purposes of consistency and ease of understanding, like features are identified (although, in some examples, not illustrated) by reference designators in the exemplary figures. However, the features in different implementations may differ in other respects and shall not be narrowly confined to what is illustrated in the figures.

The disclosure uses the phrases "in one implementation," or "in some implementations," which may refer to one or more of the same or different implementations. The term "coupled" is defined as connected, whether directly or indirectly, through intervening components and is not necessarily limited to physical connections. The term "comprising" means "including, but not necessarily limited to" and specifically indicates open-ended inclusion or membership in the so-described combination, group, series, and the equivalent.

For purposes of explanation and non-limitation, specific details such as functional entities, techniques, protocols, and standards are set forth for providing an understanding of the disclosed technology. Detailed disclosure of well-known methods, technologies, systems, and architectures are omitted so as not to obscure the present disclosure with unnecessary details.

Persons skilled in the art will recognize that any disclosed coding function(s) or algorithm(s) described in the present disclosure may be implemented by hardware, software, or a combination of software and hardware. Disclosed functions may correspond to modules that are software, hardware, firmware, or any combination thereof.

A software implementation may include a program having computer-executable instructions stored on a computer-readable medium, such as memory or other type of storage devices. For example, one or more microprocessors or general-purpose computers with communication processing capability may be programmed with executable instructions and perform the disclosed function(s) or algorithm(s).

The microprocessors or general-purpose computers may be formed of application-specific integrated circuits (ASICs), programmable logic arrays, and/or one or more digital signal processors (DSPs). Although some of the disclosed implementations are oriented to software installed and executing on computer hardware, alternative implementations implemented as firmware, as hardware, or as a combination of hardware and software are well within the scope of the present disclosure. The computer readable medium includes, but is not limited to, random-access memory (RAM), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-readable instructions.

FIG. 1 illustrates a block diagram of a system 100 configured to encode and decode video data according to an implementation of the present disclosure. The system 100 includes a first electronic device 110, a second electronic device 120, and a communication medium 130.

The first electronic device 110 may be a source device including any device configured to encode video data and transmit encoded video data to the communication medium 130. The second electronic device 120 may be a destination device including any device configured to receive encoded video data via the communication medium 130 and decode encoded video data.

The first electronic device 110 may communicate via wire or wirelessly with the second electronic device 120 via the communication medium 130. The first electronic device 110 may include a source module 112, an encoder module 114, and a first interface 116. The second electronic device 120 may include a display module 122, a decoder module 124, and a second interface 126. The first electronic device 110 may be a video encoder and the second electronic device 120 may be a video decoder.

The first electronic device 110 and/or the second electronic device 120 may be a mobile phone, a tablet, a desktop, a notebook, or other electronic device. FIG. 1 illustrates one example of the first electronic device 110 and the second electronic device 120. The first electronic device 110 and second electronic device 120 may include greater or fewer components than illustrated or have a different configuration of the various illustrated components.

The source module 112 may include a video capture device to capture new video, a video archive to store previously captured video, and/or a video feed interface to receive video from a video content provider. The source module 112 may generate computer graphics-based data as the source video or generate a combination of live video, archived video, and computer-generated video as the source video. The video capture device may be a charge-coupled device (CCD) image sensor, a complementary metal-oxide-semiconductor (CMOS) image sensor, or a camera.

The encoder module 114 and the decoder module 124 may each be implemented as any of a variety of suitable encoder/decoder circuitry, such as one or more microprocessors, a central processing unit (CPU), a graphics processing unit (GPU), a system-on-a-chip (SoC), digital signal processors (DSPs), application-specific integrated circuits (ASICs), field-programmable gate arrays (FPGAs), discrete logic, software, hardware, firmware, or any combinations thereof. When implemented partially in software, a device may store the program having instructions for the software in a suitable, non-transitory computer-readable medium and execute the instructions in hardware using one or more processors to perform the disclosed methods. Each of the encoder module 114 and the decoder module 124 may be included in one or more encoders or decoders, any of which may be integrated as part of a combined encoder/decoder (CODEC) in a device.

The first interface 116 and the second interface 126 may utilize customized protocols or follow existing standards or de facto standards including, but not limited to, Ethernet, IEEE 802.11 or IEEE 802.15 series, wireless USB or telecommunication standards including, but not limited to, Global System for Mobile Communications (GSM), Code-Division Multiple Access 2000 (CDMA2000), Time Division Synchronous Code Division Multiple Access (TD-SCDMA), Worldwide Interoperability for Microwave Access (WiMAX), Third Generation Partnership Project Long-Term Evolution (3GPP-LTE) or Time-Division LTE (TD-LTE). The first interface 116 and the second interface 126 may each include any device configured to transmit and/or store a compliant video bitstream via the communication medium 130 and to receive the compliant video bitstream via the communication medium 130.

The first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, Inter-Integrated Circuit (I2C) protocols, or any other logical and physical structure that may be used to interconnect peer devices.

The display module 122 may include a display using liquid crystal display (LCD) technology, plasma display technology, organic light emitting diode (OLED) display technology, or light-emitting polymer display (LPD) technology, with other display technologies used in other implementations. The display module 122 may include a high-definition display or an ultra-high-definition display.

Figure 2:
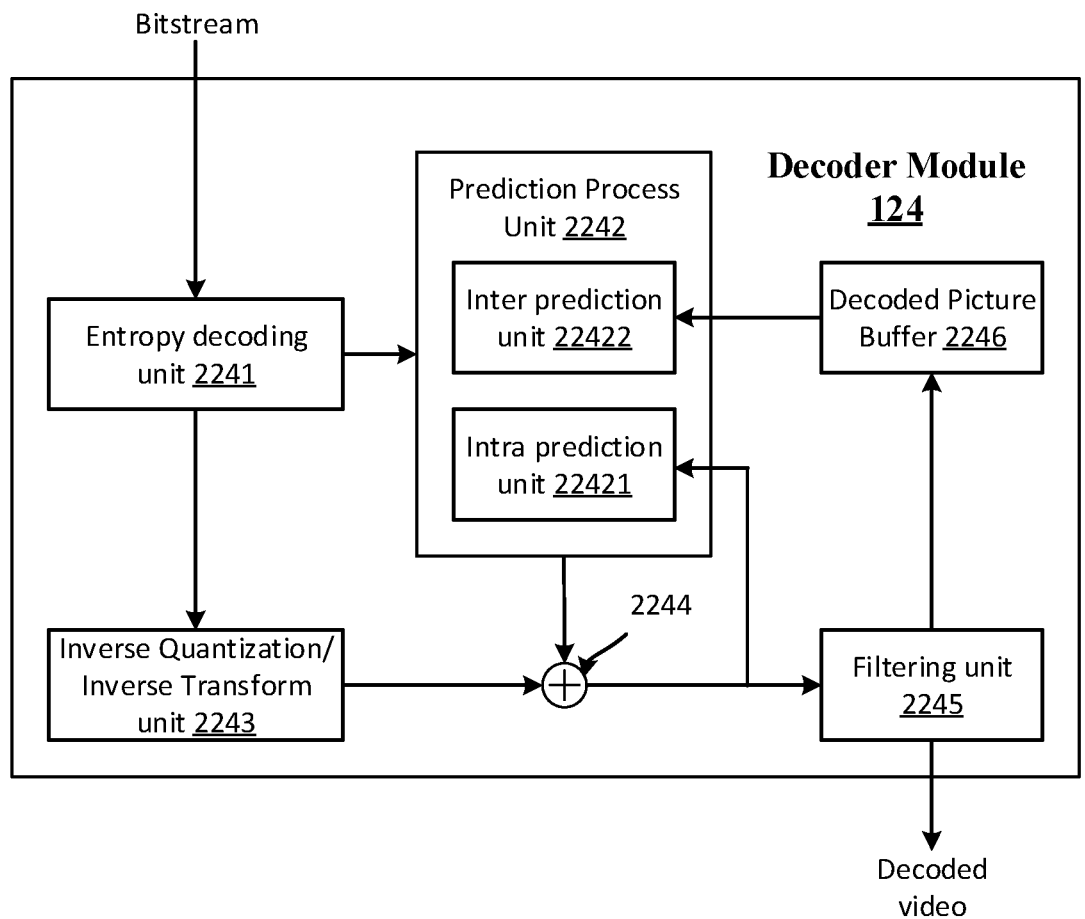
FIG. 2 illustrates a block diagram of a decoder module of a second electronic device illustrated in FIG. 1 according to an implementation of the present disclosure.

FIG. 2 illustrates a block diagram of the decoder module 124 of the second electronic device 120 illustrated in FIG. 1 according to an implementation of the present disclosure. The decoder module 124 includes an entropy decoder (e.g., entropy decoding unit 2241), a prediction processor (e.g., prediction process unit 2242), an inverse quantization/inverse transform processor (e.g., inverse quantization/inverse transform unit 2243), a summer (e.g., summer 2244), a filter (e.g., filtering unit 2245), and a decoded picture buffer (e.g., decoded picture buffer 2246). The prediction process unit 2242 further includes an intra prediction processor (e.g., intra prediction unit 22421) and an inter prediction processor (e.g., inter prediction unit 22422). The decoder module 124 receives a bitstream and decodes the bitstream to output decoded video.

The entropy decoding unit 2241 may receive the bitstream including a plurality of syntax elements from the second interface 126 in FIG. 1 and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and other syntax information.

The entropy decoding unit 2241 may perform context adaptive variable length coding (CAVLC), context adaptive binary arithmetic coding (CABAC), syntax-based context-adaptive binary arithmetic coding (SBAC), probability interval partitioning entropy (PIPE) coding, or another entropy coding technique to generate the quantized transform coefficients. The entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction process unit 2242.

The prediction process unit 2242 may receive syntax elements, such as motion vectors, intra modes, partition information, and other syntax information, from the entropy decoding unit 2241. The prediction process unit 2242 may receive the syntax elements including the partition information and divide image frames according to the partition information.

Each of the image frames may be divided into at least one image block according to the partition information. The at least one image block may include a luminance block for reconstructing a plurality of luminance samples and at least one chrominance block for reconstructing a plurality of chrominance samples. The luminance block and the at least one chrominance block may be further divided to generate macroblocks, coding tree units (CTUs), coding blocks (CBs), sub-divisions thereof, and/or another equivalent coding unit.

During the decoding process, the prediction process unit 2242 may receive predicted data including the intra mode or the motion vector for a current image block of a specific one of the image frames. The current image block may be the luminance block or one of the chrominance blocks in the specific image frame.

The intra prediction unit 22421 may perform intra-predictive coding of a current block unit relative to one or more neighboring blocks in the same frame as the current block unit based on syntax elements related to the intra mode in order to generate a predicted block. The intra mode may specify the location of reference samples selected from the neighboring blocks within the current frame. The intra prediction unit 22421 may reconstruct a plurality of chroma components of the current block unit based on a plurality of luma components of the current block unit when the chroma components are reconstructed by the prediction process unit 2242.

The intra prediction unit 22421 may reconstruct a plurality of chroma components of the current block unit based on the plurality of luma components of the current block unit when the luma components of the current block are reconstructed by the prediction process unit 2242.

The inter prediction unit 22422 may perform inter-predictive coding of the current block unit relative to one or more blocks in one or more reference image blocks based on syntax elements related to the motion vector in order to generate the predicted block. The motion vector may indicate a displacement of the current block unit within the current image block relative to a reference block unit within the reference image block. The reference block unit is a block determined to closely match the current block unit. The inter prediction unit 22422 may receive the reference image block stored in the decoded picture buffer 2246 and reconstruct the current block unit based on the received reference image blocks.

The inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

The inverse transformation may be inversely applied by the transformation process such as discrete cosine transform (DCT), discrete sine transform (DST), adaptive multiple transform (AMT), mode-dependent non-separable secondary transform (MDNSST), Hypercube-Givens transform (HyGT), signal-dependent transform, Karhunen-Loéve transform (KLT), wavelet transform, integer transform, sub-band transform, or a conceptually similar transform. The inverse transformation may convert the residual information from a transform domain, such as a frequency domain, back to the pixel domain. The degree of inverse quantization may be modified by adjusting a quantization parameter.

The summer 2244 adds the reconstructed residual block to the predicted block provided from the prediction process unit 2242 to produce a reconstructed block.

The filtering unit 2245 may include a deblocking filter, a sample adaptive offset (SAO) filter, a bilateral filter, and/or an adaptive loop filter (ALF) to remove blocking artifacts from the reconstructed block. Additional filters (in loop or post loop) may also be used in addition to the deblocking filter, the SAO filter, the bilateral filter, and the ALF. Such filters are not explicitly illustrated for brevity but may filter the output of the summer 2244. The filtering unit 2245 may output the decoded video to the display module 122 or other video receiving unit after the filtering unit 2245 performs the filtering process for the reconstructed blocks of the specific image frame.

The decoded picture buffer 2246 may be a reference picture memory that stores the reference block for use by the prediction process unit 2242 in decoding the bitstream (in inter coding modes). The decoded picture buffer 2246 may be formed by any of a variety of memory devices, such as dynamic random-access memory (DRAM), including synchronous DRAM (SDRAM), magneto-resistive RAM (MRAM), resistive RAM (RRAM), or other types of memory devices. The decoded picture buffer 2246 may be on-chip with other components of the decoder module 124 or off-chip relative to those components.

Figure 3:
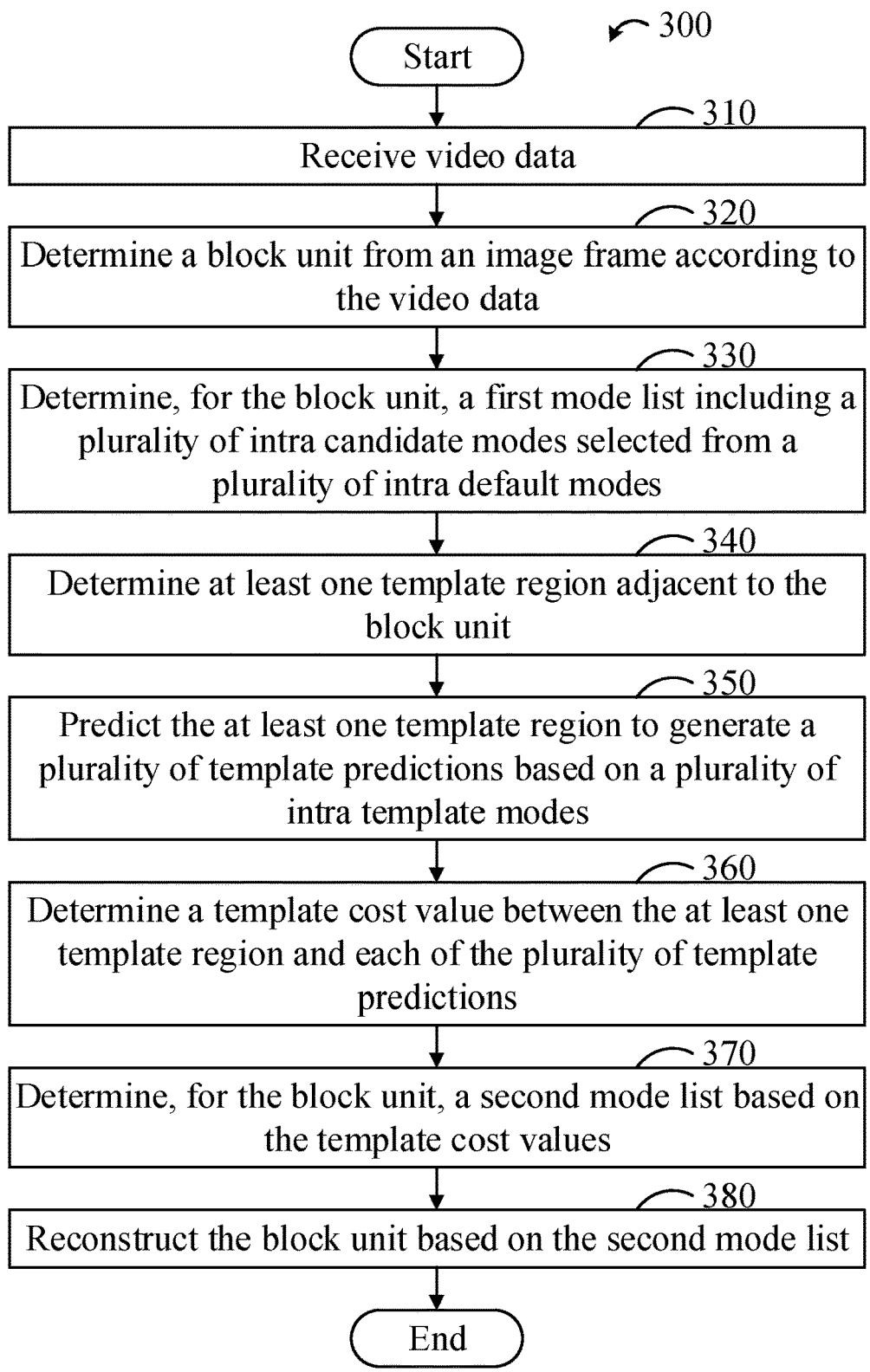
FIG. 3 illustrates a flowchart of a method for decoding/encoding video data by an electronic device according to an implementation of the present disclosure.

FIG. 3 illustrates a flowchart of a method 300 for decoding/encoding video data by an electronic device according to an implementation of the present disclosure. The method 300 is an example only, as there are a variety of ways to perform decoding of the video data.

The method 300 may be performed using the configurations illustrated in FIG. 1 and FIG. 2, and various elements of these figures are referenced with regard to the method 300. Each block illustrated in FIG. 3 may represent one or more processes, methods, or subroutines performed.

The order of blocks in FIG. 3 is illustrative only and may change. Additional blocks may be added or fewer blocks may be utilized without departing from the present disclosure.

At block 310, the decoder module 124 receives video data. The video data received by the decoder module 124 may be a bitstream.

With reference to FIG. 1 and FIG. 2, the second electronic device 120 may receive the bitstream from an encoder, such as the first electronic device 110, or other video providers via the second interface 126. The second interface 126 may provide the bitstream to the decoder module 124.

The entropy decoding unit 2241 may decode the bitstream to determine a plurality of prediction indications and a plurality of partitioning indications for a plurality of image frames. Then, the decoder module 124 may further reconstruct the plurality of image frames based on the prediction indications and the partitioning indications. The prediction indications and the partitioning indications may include a plurality of flags and a plurality of indices.

At block 320, the decoder module 124 determines a block unit from an image frame according to the video data.

With reference to FIG. 1 and FIG. 2, the decoder module 124 may determine the image frame according to the bitstream when the video data received by the decoder module 124 is the bitstream. The decoder module 124 may further divide the image frame to determine the block unit according to the partition indications in the bitstream. For example, the decoder module 124 may divide the image frames to generate a plurality of CTUs, and further divide one of the CTUs to determine the block unit according to the partition indications based on any video coding standard.

At block 330, the decoder module 124 determines, for the block unit, a first mode list including a plurality of intra candidate modes selected from a plurality of intra default modes.

With reference to FIG. 1 and FIG. 2, the decoder module 124 may determine the intra default modes for predicting the block unit by intra prediction. The intra default modes may include a plurality of non-angular modes and a plurality of angular modes. The non-angular modes may include at least one of a Planar mode, a DC mode, a Matrix-based Intra Prediction (MIP) mode, a Cross Component Linear Model (CCLM) mode for chroma block, or a Decoder-side Intra Mode Derivation (DIMD) mode. In addition, the angular modes may include a plurality of angular default modes. The number of the angular default modes may be equal to 33 for the method 300 when the decoder module 124 decodes the block unit in high efficiency video coding (HEVC). The number of the angular default modes may be equal to 65 for the method 300 when the decoder module 124 decodes the block unit in versatile video coding (VVC) or VVC test model (VTM). Furthermore, the number of the angular default modes may be equal to 129 for the method 300 when the decoder module 124 decodes the block unit in enhanced compression model (ECM). Thus, the number of the intra default modes may be equal to 35 for the method 300 in HEVC, the number of the intra default modes may be equal to 67 for the method 300 in VVC or VTM, and the number of the intra default modes may be equal to 131 for the method 300 in ECM when the non-angular modes only include the Planar mode and the DC mode and when the angular modes only include the angular default modes.

The angular modes may further include a plurality of wide angle intra prediction (WAIP) modes. The WAIP modes may be different from the angular default modes. The angular default modes may be distributed in a horizontal region sandwiched between a bottom-left direction and a top-left direction and a vertical region sandwiched between a top-right direction and the top-left direction, and the WAIP modes may not be distributed in the horizontal region and the vertical region. In some implementations, the WAIP mode index may be (−1~−14, 67~80) in VVC or VTM. In some implementations, the WAIP modes index may be (−1~−29, 131~159) in ECM. In some implementations, the WAIP modes may be used to replace the angular default modes. In some implementations, the angular modes may include the angular default modes and the WAIP modes when the WAIP modes are not used to replace the angular default modes.

The intra candidate modes may be selected from the intra default modes to generate the first mode list based on a predefined criterion. For example, the intra candidate modes may be selected from the intra default modes based on at least one intra neighboring mode of a plurality of neighboring blocks neighboring the blocks. The decoder module 124 may determine the neighboring blocks according to a plurality of neighboring positions. The neighboring positions may include at least one of a Left position located to the left side of a bottom-left corner of the block unit, an Above position located above a top-right corner of the block unit, a Bottom-Left position located below the Left position, an Above-Left position located to the above-left side of a top-left corner of the block unit, or an Above-Right position located to the right side of the Above position. The Above-Right position is located to the above-right side of a top-right corner of the block unit, and the Bottom-Left position is located to the bottom-left side of the bottom-left corner of the block unit. When a reconstructed block neighboring the block unit covers at least one of the neighboring positions, the reconstructed block may be one of the neighboring blocks. Thus, each of the neighboring blocks determined for the block unit is reconstructed prior to reconstructing the block unit.

The decoder module 124 may determine a plurality of neighboring prediction modes of the neighboring blocks. When a specific one of the neighboring prediction modes belongs to the intra default modes, the specific neighboring prediction mode may be regarded as one of at least one intra neighboring mode for the block unit. The decoder module 124 may select the intra candidate modes based on the at least one intra neighboring mode. For example, the at least one intra neighboring mode may be directly added into the intra candidate modes. In addition, a specific one of the intra default modes may be added into the intra candidate modes when a difference between a mode index of the specific intra default mode and a mode index of a specific one of the intra neighboring modes is less than an index threshold. For example, the index threshold may be a positive integer, such as 1, 2, 3, and 4. In some implementations, at least one of the non-angular modes may be directly added into the intra candidate modes.

In some implementations, the intra candidate list may include a plurality of most probable modes (MPMs) determined based on the at least one intra neighboring mode and included in a MPM list. The MPM list may include at least one of a primary MPM (PMPM) list or a secondary MPM (SMPM) list. The number of the MPMs in the PMPM list may be equal to six, and the number of the MPMs in the SMPM list may be equal to sixteen. The PMPM list may include at least one of the non-angular modes or the angular modes derived based on the at least one intra neighboring mode, and the SMPM list may be derived from the PMPM list. In some implementations, the intra candidate list may include a plurality of non-MPMs excluded from the MPM list.

The maximum number of the intra candidate modes in the first mode list may be equal to a positive integer N. When the number of the at least one intra neighboring mode regarded as the intra candidate modes is equal to a positive Nn less than the positive integer N, the decoder module 124 may derive (N-Nn) intra candidate modes based on the at least one intra neighboring mode and add the derived (N-Nn) intra candidate modes into the first mode list. In some implementations, the maximum number of the intra candidate modes in the first mode list may be equal to 6, 10, 16, 22, 45, or other positive integers.

Continuing with FIG. 3, at block 340, the decoder module 124 determines at least one template region adjacent to the block unit.

Figure 4:
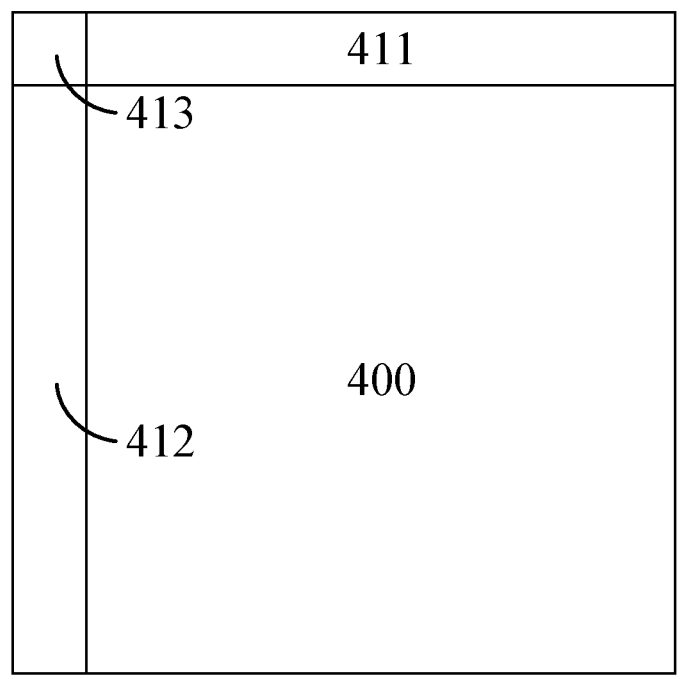
FIG. 4 is an illustration of an example implementation of a block unit and a plurality of adjacent regions according to an embodiment of the present disclosure.

FIG. 4 is an illustration of an example implementation of a block unit 400 and a plurality of adjacent regions 411-413 according to an embodiment of the present disclosure. A first adjacent region 411 may be an above adjacent region located above the block unit 400, a second adjacent region 412 may be a left adjacent region located to the left side of the block unit 400, and a third adjacent region 413 may be an above-left adjacent region located to the top-left side of the block unit 400. The adjacent regions 411-413 are reconstructed prior to reconstructing the block unit 400. A height of the above adjacent region may be equal to a number R of the reconstructed samples of the first adjacent region 411 along a vertical direction, and a width of the above adjacent region may be equal to a width of the block unit 400. A height of the left adjacent region may be equal to a height of the block unit 400, and a width of the left adjacent region may be equal to a number S of the reconstructed samples of the second adjacent region 412 along a horizontal direction. In addition, a height of the above-left adjacent region may be equal to the number R of the reconstructed samples of the first adjacent region 411 along the vertical direction, and a width of the above-left adjacent region may be equal to the number S of the reconstructed samples of the second adjacent region 412 along the horizontal direction. In one implementation, the numbers R and S may be positive integers. In addition, the numbers R and S may be equal to or different from each other. Furthermore, the numbers R and S may be greater than or equal to one. In some implementation, the numbers R and S may be equal to one.

With reference to FIG. 1 and FIG. 2, the decoder module 124 may determine the at least one template region adjacent to the block unit. The decoder module 124 may use the adjacent regions 411-413 as the template regions for predicting the block unit 400. In addition, the decoder module 124 may use two of the adjacent regions 411-413 as the template regions for predicting the block unit 400. For example, the decoder module 124 may only use the first and second adjacent regions 411 and 412 as the template regions for predicting the block unit 400. Furthermore, the decoder module 124 may only use one of the adjacent regions 411-413 as the template region for predicting the block unit 400.

In some implementations, the first adjacent region 411 may be included in the at least one template region when a width of the block unit 400 may be greater than a height of the block unit 400. The adjacent regions 411 and 413 may be included in the at least one template region when the width of the block unit 400 may be greater than the height of the block unit 400. The second adjacent region 412 may be included in the at least one template region when the width of the block unit 400 may be less than the height of the block unit 400. The adjacent regions 412 and 413 may be included in the at least one template region when the width of the block unit 400 may be less than the height of the block unit 400. The adjacent regions 411 and 412 may be included in the at least one template region when the width of the block unit 400 may be equal to the height of the block unit 400. In some implementations, the adjacent regions 411-413 may be included in the at least one template region when the width of the block unit 400 may be equal to the height of the block unit 400.

Returning to FIG. 3, at block 350, the decoder module 124 predicts the at least one template region to generate a plurality of template predictions based on a plurality of intra template modes.

Each of the intra template modes may indicate one of the intra candidate modes included in the first mode list and one of a plurality of template reference lines included in a template line list. The template reference lines may be selected from a plurality of template candidate lines. The template candidate lines may include a template adjacent line adjacent to the at least one template region and a plurality of template neighboring lines adjacent to the template adjacent line and nonadjacent to the at least one template region. Thus, the template adjacent line may be sandwiched between the at least one template region and the at least one template neighboring line. In addition, a first template neighboring line may be adjacent to the template adjacent line, a second template neighboring line may be adjacent to the first template neighboring line, a third template neighboring line may be adjacent to the second template neighboring line, and a P-th template neighboring line may be adjacent to a (P-1)th template neighboring line. The number P may be a positive integer greater than or equal to two. The template adjacent line may be selected into the template line list as one of the template reference lines, and at least one of the template neighboring lines may be selected into the template line list as at least one of the template reference lines.

Figure 5:
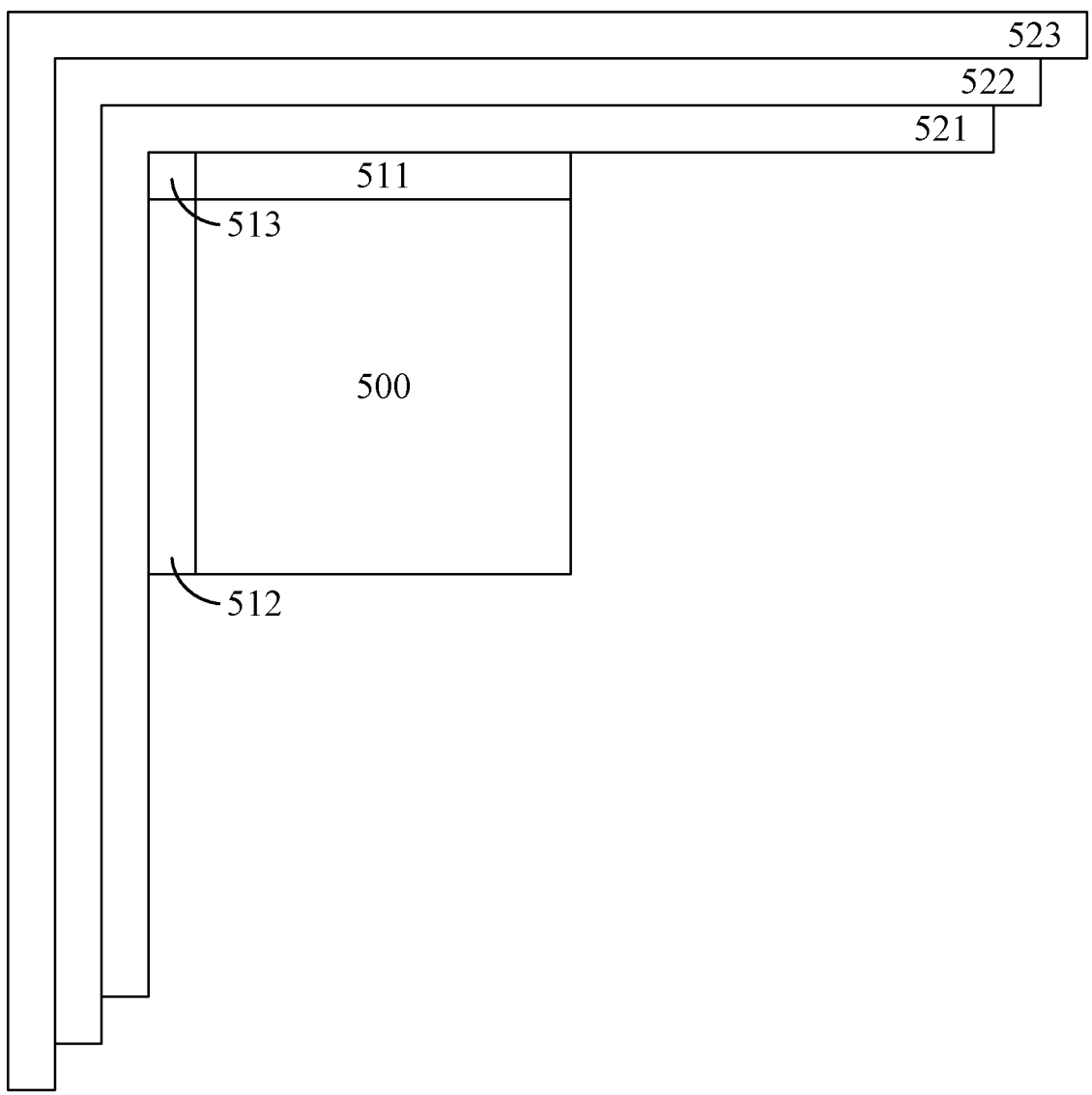
FIG. 5 is an illustration of an example implementation of a block unit, a plurality of adjacent regions, and template reference lines according to an embodiment of the present disclosure.

FIG. 5 is an illustration of an example implementation of a block unit 500, a plurality of adjacent regions 511-513, and the template reference lines 521-523 according to an embodiment of the present disclosure. The template reference line 521 may be the template adjacent line adjacent to the adjacent regions 511-513, and the template reference lines 522 and 523 may be the template neighboring lines adjacent to the template reference line 521 and non-adjacent to the adjacent regions 511-513. Thus, the template reference line 521 and the template reference lines 522 and 523 may be included in the template line list.

The template line list may include the template adjacent line regarded as a first template reference line and further include (M-1) template neighboring lines regarded as a second template reference line to an M-th template reference line. In some implementations, the number M may be an integer greater than or equal to zero and be equal to the number of the template reference lines. In some implementations, the template reference lines included in the template line list may be the template adjacent line, the second template neighboring line, the fourth template neighboring line, the sixth template neighboring line, and the eleventh template neighboring line. When the height of the above adjacent region and the width of the left adjacent region is equal to one, the above adjacent region and the left adjacent region in the template regions may be similar to a regular reference line of the block unit. In other words, the template adjacent line adjacent to the above adjacent region and the left adjacent region may be a first extended reference line in a multiple reference line (MRL) mode. In addition, the second template neighboring line may be a third extended reference line in the MRL mode, the fourth template neighboring line may be a fifth extended reference line in the MRL mode, the sixth template neighboring line may be a seventh extended reference line in the MRL mode, and the eleventh template neighboring line may be a twelfth extended reference line in the MRL mode.

With reference to FIG. 1 and FIG. 2, the decoder module 124 may predict the at least one template region based on one of the intra template modes indicating one of the intra candidate modes and one of the template reference lines to generate one of the template predictions. Thus, when the number of the intra candidate modes is equal to N and the number of the template reference lines is equal to M, the number of the intra template modes may be equal to N×M. In addition, the number of the template predictions may also be equal to N×M.

In some implementation, when the bitstream includes a non-adjacent index indicating one of the template reference lines for the block unit, the template reference line of the block unit may be directly selected based on the non-adjacent index of the bitstream. Thus, when the number of the intra candidate modes is equal to N and the number of the template reference lines is equal to M, the number of the intra template modes and the number of the template predictions may be still equal to N since a specific one of the template reference lines is directly selected for the block unit without selecting the specific template reference line based on template cost derivations.

Returning to FIG. 3, at block 360, the decoder module 124 determines a template cost value between the at least one template region and each of the plurality of template predictions.

With reference to FIG. 1 and FIG. 2, since the at least one template region is reconstructed prior to reconstructing the block unit, the decoder module 124 may directly receive a reconstructed result of the at least one template region. The decoder module 124 may derive the template cost values between the at least one template region and the template predictions by an intra template matching. The intra template matching (TM) may be calculated based on a difference between the reconstructed result and each of the template predictions. The reconstructed result may include a plurality of reconstructed samples of the at least one template region, and each of the template predictions may include a plurality of predicted samples for the at least one template region. Thus, the template cost value for each of the template predictions is a TM template cost value determined by comparing the reconstructed samples of the at least one template region with the predicted samples for one of the template predictions.

The difference between the reconstructed result and one of the template predictions may be calculated based on a Mean Squared Error (MSE) calculation. In addition, the difference between the reconstructed result and one of the template predictions may be calculated based on a Sum of Absolute Difference (SAD) calculation. In some implementations, the difference between the reconstructed result and one of the template predictions may be calculated based on a Sum of Absolute Transformed Difference (SATD) calculation. Each of the differences generated by calculating between the reconstructed result and the template predictions may be regarded as a TM cost.

The template predictions each generated for the at least one template region based on a corresponding one of the intra template modes are compared with the reconstructed result of the at least one template region for generating the template cost values. Thus, the number of the intra template modes is equal to the number of the template predictions and is also equal to the number of the template cost values. Thus, when the number of the intra candidate modes is equal to N and the number of the template reference lines is equal to M, the number of the template cost values is equal to N×M. In other implementations, when the number of the intra candidate modes is equal to N and the number of the template reference lines is equal to M, the number of the template cost values may be still equal to N since a specific one of the template reference lines is directly selected for the block unit based on the non-adjacent index.

Returning to FIG. 3, at block 370, the decoder module 124 determines, for the block unit, a second mode list based on the template cost values.

With reference to FIG. 1 and FIG. 2, the decoder module 124 may determine an arrangement of the intra template modes based on the template cost values and reorder the intra template modes based on the arrangement. In some implementations, the intra template modes may be reordered in an ascending order or a descending order of the template cost values.

Before the arrangement is determined based on the template cost values, the intra template modes may be ordered based on arbitrary rules. For example, the intra template modes may be ordered based on a line order of the template reference lines. In addition, the intra template modes may be ordered based on a mode order of the intra candidate modes.

The intra template modes may be reordered in the ascending order of the template cost values. Thus, when the template cost value of a specific one of the intra template modes is less than the template cost values of the other intra template modes, the specific intra template mode may be moved forward to be a first intra template mode based on the arrangement. In other words, the specific intra template mode may be moved to be the first intra template mode when the template cost value of the specific intra template mode is the minimum of the template cost values of the intra template modes. In addition, the specific intra template mode may be moved to be a last one of the intra template modes when the template cost value of the specific intra template mode is the maximum of the template cost values of the intra template modes. For example, the intra template modes may include six intra template modes TM1, TM2, TM3, TM4, TM5 and TM6 having six template cost values (CV1, CV2, CV3, CV4, CV5, and CV6) when the number N is equal to three and the number M is equal to two. When a value order of the six template cost values is CV4>CV2>CV5>CV1>CV6>CV3, the arrangement of the intra template modes may be changed from an original order of the six intra template modes TM1, TM2, TM3, TM4, TM5 and TM6 to a new order of the six intra template modes TM3, TM6, TM1, TM5, TM2, and TM4.

The arrangement may be further determined by adjusting the new order of the intra template modes based on a diversity criterion. The decoder module 124 may determine a difference value between two of the template cost values selected from two neighboring ones of the intra template modes ordered in the new order. When the difference value is less than or equal to a diversity threshold, the last one of the two neighboring ones of the intra template modes may be moved backward. For example, the value order of the six template cost values is CV4>CV2>CV5>CV1>CV6>CV3, and the difference between two of the template cost values CV1 and CV6 is less than the diversity threshold. Thus, the intra template mode TM1 may be moved backward. Therefore, the arrangement of the intra template modes may be further changed from the new order of the six intra template modes TM3, TM6, TM1, TM5, TM2, and TM4 to a final order of the six intra template modes TM3, TM6, TM5, TM1, TM2, and TM4. In some implementations, the arrangement may not be determined by adjusting the new order of the intra template modes based on the diversity criterion, so the arrangement may be identical to the new order of the intra template modes.

The decoder module 124 may select K intra template modes having the least template cost values from the intra template modes and add the selected intra template modes into the second mode list. The number K, being a positive integer, may be equal to the number of the intra template modes in the second mode list and less than the total quantity of the intra template modes. In other words, the decoder module 124 may select the first to the K-th intra template modes ordered based on the arrangement when the intra template modes are reordered in the ascending order of the template cost values to generate the arrangement.

Each of the intra template modes in the second mode list may have a template mode index. Thus, the template mode index for the second mode list may be within an index range of 0 to K-1 since the number of the intra template modes in the second mode list is equal to K.

The intra template modes may be able to be divided into several mode groups based on the intra candidate modes. For example, the intra candidate modes may be divided into a PMPM group and an SMPM group. In addition, the intra candidate modes may be divided into a MPM group and a non-MPM group. Thus, the intra template modes may be divided into a template PMPM group and a template SMPM group. In addition, the intra template modes may be divided into a template MPM group and a template non-MPM group. Furthermore, the intra template modes may be able to be divided into several mode groups based on the template reference lines. For example, each of the template reference lines may be used to determine a reference line group. Thus, the intra template modes may be divided into M template line groups. All of the intra template modes included in one of the template line groups indicates the same template reference line and different intra template modes.

In some implementations, the intra template modes in each of the mode groups may be reordered in the ascending order of the template cost values of the intra template modes in a corresponding one of the mode groups. Thus, when the template cost value of a specific one of the intra template modes included in a specific one of the mode groups is less than the template cost values of the other intra template modes in the specific mode group, the specific intra template mode may be moved forward to be a first intra template mode in the specific mode group based on the arrangement. In other words, the specific intra template mode may be moved to be a first intra template mode in the specific mode group when the template cost value of the specific intra template mode in the specific mode group is the minimum of the template cost values of the specific mode group.

The decoder module 124 may select two neighboring mode groups to adjust the intra template modes. For example, when the number of the mode groups is equal to two, the two mode groups may be directly selected for adjusting the intra template modes. In addition, when the number of the mode groups is equal to three, the first two or the last two of the three mode groups may be directly selected for adjusting the intra template modes.

The decoder module 124 may select the last Q of the intra template modes in the first one of the two neighboring mode groups and select the first R of the intra template modes in the last one of the two neighboring mode groups. In some implementation, the number Q and the number R may be a positive integer, and the number Q and the number R may be equal to or different from each other. In addition, the decoder module 124 may generate a temporary list including the last Q of the intra template modes and the first R of the intra template modes and further determine a temporary arrangement based on the template cost values of the last Q of the intra template modes and the first R of the intra template modes. The decoder module 124 may reorder the last Q of the intra template modes and the first R of the intra template modes based on the temporary arrangement to generate a plurality of temporary template modes. Then, the decoder module 124 may further add a first Q of the temporary template modes into the first one of the two neighboring mode groups and add the other temporary template modes into the last one of the two neighboring mode groups. The first Q of the temporary template modes may be added behind the other intra template modes in the first one of the two neighboring mode groups, and the last R of the temporary template modes may be added in front of the other intra template modes in the last one of the two neighboring mode groups. Thus, the intra template modes in one of the mode groups may be exchange groups with the intra template modes in another mode group based on the TM template cost values.

Returning to FIG. 3, at block 380, the decoder module 124 reconstructs the block unit based on the second mode list.

With reference to FIG. 1 and FIG. 2, the decoder module 124 may select, based on a template mode index, one of the intra template modes ordered based on the arrangement from the second mode list. The template mode index may indicate a prediction mode of the block unit from the intra template modes ordered based on the arrangement in the second mode list.

An index value of the template mode index may be within an index range of 0 to K-1. Therefore, the intra template modes arranged after a K-th of the intra template modes ordered by the arrangement may be excluded from selecting the prediction mode since the index value of the template mode index may not be greater than K-1.

The decoder module 124 may determine a selected one of the intra template modes based on the template mode index, and then determine the prediction mode based on the selected intra template mode indicating a specific one of the plurality of intra candidate modes and a specific one of the plurality of template reference lines for the block unit. Thus, the decoder module 124 may determine the specific intra candidate mode and the specific template reference line for the block unit and generate a predicted block of the block unit based on the specific intra candidate mode and the specific template reference line.

In addition, the number of the intra template modes may be equal to N when the specific template reference line is directly selected for the block unit based on the non-adjacent index rather than the template mode index. Thus, the decoder module 124 may determine the specific intra candidate mode for the block unit based on the template mode index and generate the predicted block of the block unit based on the specific intra candidate mode and the specific template reference line.

The decoder module 124 may further add a plurality of residual components into the prediction block to reconstruct the block unit. The residual components may be determined from the bitstream. The decoder module 124 may reconstruct all of the other block units in the image frame for reconstructing the image frame and the video data.

Figure 6:
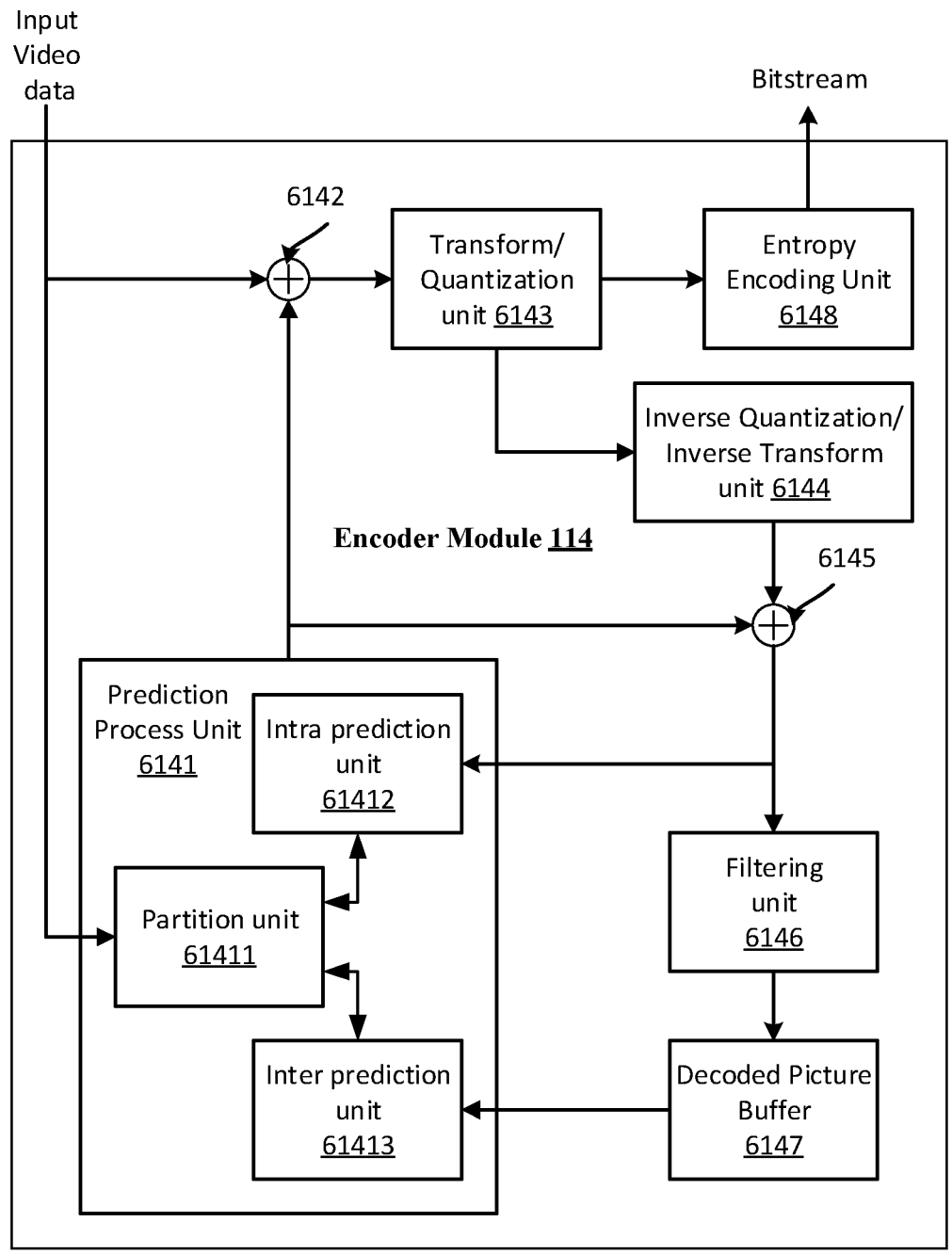
FIG. 6 illustrates a block diagram of an encoder module of a first electronic device illustrated in FIG. 1 according to an implementation of the present disclosure.

FIG. 6 illustrates a block diagram of the encoder module 114 of the first electronic device 110 illustrated in FIG. 1 according to an implementation of the present disclosure. The encoder module 114 may include a prediction processor (e.g., prediction process unit 6141), at least a first summer (e.g., first summer 6142) and a second summer (e.g., second summer 6145), a transform/quantization processor (e.g., transform/quantization unit 6143), an inverse quantization/ inverse transform processor (e.g., inverse quantization/inverse transform unit 6144), a filter (e.g., filtering unit 6146), a decoded picture buffer (e.g., decoded picture buffer 6147), and an entropy encoder (e.g., entropy encoding unit 6148). The prediction process unit 6141 of the encoder module 114 may further include a partition processor (e.g., partition unit 61411), an intra prediction processor (e.g., intra prediction unit 61412), and an inter prediction processor (e.g., inter prediction unit 61413).

The encoder module 114 may receive the source video and encode the source video to output a bitstream. The encoder module 114 may receive source video including a plurality of image frames and then divide the image frames according to a coding structure. Each of the image frames may be divided into at least one image block.

The at least one image block may include a luminance block having a plurality of luminance samples and at least one chrominance block having a plurality of chrominance samples. The luminance block and the at least one chrominance block may be further divided to generate macroblocks, coding tree units (CTUs), coding blocks (CBs), subdivisions thereof, and/or another equivalent coding unit.

The encoder module 114 may perform additional subdivisions of the source video. It should be noted that the disclosed implementations are generally applicable to video coding regardless of how the source video is partitioned prior to and/or during the encoding.

During the encoding process, the prediction process unit 6141 may receive a current image block of a specific one of the image frames. The current image block may be the luminance block or one of the chrominance blocks in the specific image frame.

The partition unit 61411 may divide the current image block into multiple block units. The intra prediction unit 61412 may perform intra-predictive coding of a current block unit relative to one or more neighboring blocks in the same frame as the current block unit in order to provide spatial prediction. The inter prediction unit 61413 may perform inter-predictive coding of the current block unit relative to one or more blocks in one or more reference image blocks to provide temporal prediction.

The prediction process unit 6141 may select one of the coding results generated by the intra prediction unit 61412 and the inter prediction unit 61413 based on a mode selection method, such as a cost function. The mode selection method may be a rate-distortion optimization (RDO) process.

The prediction process unit 6141 may determine the selected coding result and provide a predicted block corresponding to the selected coding result to the first summer 6142 for generating a residual block and to the second summer 6145 for reconstructing the encoded block unit. The prediction process unit 6141 may further provide syntax elements, such as motion vectors, intra mode indicators, partition information, and other syntax information, to the entropy encoding unit 6148.

The intra prediction unit 61412 may intra predict the current block unit. The intra prediction unit 61412 may determine an intra prediction mode directed toward a reconstructed sample neighboring the current block unit in order to encode the current block unit.

The intra prediction unit 61412 may encode the current block unit using various intra prediction modes. The intra prediction unit 61412 of the prediction process unit 6141 may select an appropriate intra prediction mode from the selected modes. The intra prediction unit 61412 may encode the current block unit using a cross component prediction mode to predict one of the two chroma components of the current block unit based on the luma components of the current block unit. The intra prediction unit 61412 may predict a first one of the two chroma components of the current block unit based on the second of the two chroma components of the current block unit.

The inter prediction unit 61413 may inter predict the current block unit as an alternative to the intra prediction performed by the intra prediction unit 61412. The inter prediction unit 61413 may perform motion estimation to estimate motion of the current block unit for generating a motion vector.

The motion vector may indicate a displacement of the current block unit within the current image block relative to a reference block unit within a reference image block. The inter prediction unit 61413 may receive at least one reference image block stored in the decoded picture buffer 6147 and estimate the motion based on the received reference image blocks to generate the motion vector.

The first summer 6142 may generate the residual block by subtracting the prediction block determined by the prediction process unit 6141 from the original current block unit. The first summer 6142 may represent the component or components that perform this subtraction.

The transform/quantization unit 6143 may apply a transform to the residual block in order to generate a residual transform coefficient and then quantize the residual transform coefficients to further reduce bit rate. The transform may be one of a DCT, DST, AMT, MDNSST, HyGT, signal dependent transform, KLT, wavelet transform, integer transform, sub-band transform, or a conceptually similar transform.

The transform may convert the residual information from a pixel value domain to a transform domain, such as a frequency domain. The degree of quantization may be modified by adjusting a quantization parameter.

The transform/quantization unit 6143 may perform a scan of the matrix including the quantized transform coefficients. Alternatively, the entropy encoding unit 6148 may perform the scan.

The entropy encoding unit 6148 may receive a plurality of syntax elements from the prediction process unit 6141 and the transform/quantization unit 6143, including a quantization parameter, transform data, motion vectors, intra modes, partition information, and other syntax information. The entropy encoding unit 6148 may encode the syntax elements into the bitstream.

The entropy encoding unit 6148 may entropy encode the quantized transform coefficients by performing CAVLC, CABAC, SBAC, PIPE coding, or another entropy coding technique to generate an encoded bitstream. The encoded bitstream may be transmitted to another device (e.g., the second electronic device 120 in FIG. 1) or archived for later transmission or retrieval.

The inverse quantization/inverse transform unit 6144 may apply inverse quantization and inverse transformation to reconstruct the residual block in the pixel domain for later use as a reference block. The second summer 6145 may add the reconstructed residual block to the prediction block provided from the prediction process unit 6141 in order to produce a reconstructed block for storage in the decoded picture buffer 6147.

The filtering unit 6146 may include a deblocking filter, an SAO filter, a bilateral filter, and/or an ALF to remove blocking artifacts from the reconstructed block. Additional filters (in loop or post loop) may be used in addition to the deblocking filter, the SAO filter, the bilateral filter, and the ALF. Such filters are not illustrated for brevity and may filter the output of the second summer 6145.

The decoded picture buffer 6147 may be a reference picture memory that stores the reference block for use by the encoder module 614 to encode video, such as in intra or inter coding modes. The decoded picture buffer 6147 may include a variety of memory devices, such as DRAM (e.g., including SDRAM), MRAM, RRAM, or other types of memory devices. The decoded picture buffer 6147 may be on-chip with other components of the encoder module 114 or off-chip relative to those components.

The method 300 for decoding/encoding video data may be performed by the first electronic device 110. The encoder module 114 may receive the video data. The video data received by the encoder module 114 may be a video. The encoder module 114 may determine a block unit from an image frame according to the video data. The encoder module 114 may divide the image frame to generate a plurality of CTUs, and further divide one of the CTUs to determine the block unit according to one of a plurality of partition schemes based on any video coding standard.

The encoder module 114 may determine, for the block unit, a first mode list including a plurality of intra candidate modes selected from a plurality of intra default modes. The intra default modes may include a plurality of non-angular modes and a plurality of angular modes. In addition, the intra candidate modes may be selected from the intra default modes based on at least one intra neighboring mode of a plurality of neighboring blocks neighboring the block unit.

The encoder module 114 may determine at least one template region adjacent to the block unit. The at least one template region may be selected from three adjacent regions. The encoder module 114 may predict the at least one template region to generate a plurality of template predictions based on a plurality of intra template modes. Each of the intra template modes may indicate one of the intra candidate modes included in the first mode list and one of a plurality of template reference lines included in a template line list. The template reference lines may be selected from a plurality of template candidate lines including a template adjacent line adjacent to the at least one template region and a plurality of template neighboring lines adjacent to the template adjacent line and nonadjacent to the at least one template region.

The encoder module 114 may determine a template cost value between the at least one template region and each of the plurality of template predictions. Since the at least one template region is reconstructed prior to predicting the block unit, the encoder module 114 may directly receive a plurality of reconstructed samples of the at least one template region to compare with a plurality of predicted samples for each of the template predictions. The encoder module 114 may determine a plurality of TM cost values for the intra template modes.

The encoder module 114 may determine, for the block unit, a second mode list based on the template cost values. The encoder module 114 may determine an arrangement of the intra template modes based on the template cost values and reorder the intra template modes based on the arrangement. In addition, the encoder module 114 may select the first K intra template modes ordered based on the arrangement and add the selected intra template modes into the second mode list. For example, the encoder module 114 may select K intra template modes having the least template cost values from the intra template modes and add the selected intra template modes into the second mode list when the intra template modes are reordered in the ascending order of the template cost values.

The encoder module 114 may select one of the K intra template modes in the second mode list based on a mode selection method, such as a cost function, for predicting the block unit. The encoder module 114 may predict the block unit based on the K intra template modes in the second mode list to generate a plurality of predicted blocks. Then, the encoder module 114 may further compare a plurality of the predicted samples included in each of the predicted blocks with a plurality of color components in the block unit. Thus, the encoder module 114 may determine a block cost value for each of the predicted blocks and select a prediction mode of the block unit based on the block cost value from the K intra template modes in the second mode list. The mode selection method may be a rate-distortion optimization (RDO) process. Then, the encoder module 114 may determine a plurality of residual components by comparing the color components in the block unit with the predicted samples generated based on the prediction mode. In addition, the residual components and a template mode index may be encoded into a bitstream for a decoder device to reconstruct the video data.

The encoder module 114 may further reconstruct the block unit based on the prediction mode in second mode list to generate a reconstructed block including a plurality of reconstructed samples. The reconstructed samples of the block unit may be used as references for predicting a plurality of following blocks in the video data.

Therefore, the encoder module 114 may also use the method 300 to predict and reconstruct the block unit for encoding the video data into the bitstream. Since the encoder module 114 and the decoder module 124 may use the same method 300, the encoder module 114 and the decoder module 124 may generate the same reordered list for decreasing the number of bits in the bitstream.

The disclosed implementations are to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. A method of decoding video data by an electronic device, the method comprising:
   receiving the video data;
   determining a block unit from an image frame retrieved from the video data;
   determining, for the block unit, a first mode list including a plurality of intra candidate modes selected from a plurality of intra default modes;
   predicting at least one template region, that is adjacent to the block unit, to generate a plurality of template predictions based on a plurality of intra template modes, wherein:
      each of the plurality of intra template modes indicates one of the plurality of intra candidate modes and one of a plurality of template reference lines, and
      the plurality of template reference lines includes at least one template neighboring line nonadjacent to the at least one template region;
   determining a plurality of template cost values, each of the plurality of template cost values comprising a template cost value between the at least one template region and a corresponding one of the plurality of template predictions;
   determining, for the block unit, a second mode list based on the plurality of template cost values; and
   reconstructing the block unit based on the second mode list, wherein:
      a template prediction mode is determined, based on a template mode index included in the video data, from the second mode list to reconstruct the block unit,
      the template prediction mode indicates a specific one of the plurality of intra candidate modes and a specific one of the plurality of template reference lines selected for the block unit,
      the specific one of the plurality of template reference lines is selected based on a reference line index of the block unit included in the video data, and
      the specific one of the plurality of intra candidate modes is determined, based on the template mode index, from the second mode list after determining the specific one of the plurality of template reference lines.

2. The method according to claim 1, wherein determining, for the block unit, the first mode list comprises:
   determining a plurality of neighboring blocks neighboring the block unit;
   determining at least one intra neighboring mode of the plurality of neighboring blocks, wherein each of the plurality of neighboring blocks is reconstructed based on one of the at least one intra neighboring mode; and
   selecting the plurality of intra candidate modes from the plurality of intra default modes based on the at least one intra neighboring mode to generate the first mode list of the block unit.

3. The method according to claim 2, wherein the plurality of intra candidate modes comprises a plurality of most probable modes (MPMs) determined based on the at least one intra neighboring mode.

4. The method according to claim 1, wherein the at least one template region comprises at least one of an above adjacent region located above the block unit, a left adjacent region located at a left side of the block unit, or an above-left adjacent region located at a top-left side of the block unit.

5. The method according to claim 1, wherein the plurality of template reference lines further comprises a template adjacent line adjacent to the at least one template region.

6. The method according to claim 1, wherein determining, for the block unit, the second mode list comprises:
   determining an arrangement of the plurality of intra template modes based on the plurality of template cost values; and
   determining the second mode list based on the arrangement.

7. The method according to claim 6, wherein the arrangement is generated by ordering the plurality of intra template modes in an ascending order of the plurality of template cost values.

8. The method according to claim 6, wherein:
   the second mode list comprises a first K candidate modes of the plurality of intra candidate modes ordered based on the arrangement, and
   K is a positive integer less than a number of the plurality of intra candidate modes in the first mode list.

9. The method according to claim 1, wherein the template cost value for each of the plurality of template predictions is a template-matching cost value determined by comparing a plurality of reconstructed samples in the at least one template region with a plurality of predicted samples in one of the plurality of template predictions.

10. An electronic device for decoding video data, the electronic device comprising:
at least one processor; and
at least one non-transitory computer-readable medium coupled to the at least one processor and storing one or more computer-executable instructions that, when executed by the at least one processor, cause the electronic device to:
receive the video data;
determine a block unit from an image frame retrieved from the video data;
determine, for the block unit, a first mode list including a plurality of intra candidate modes selected from a plurality of intra default modes;
predict at least one template region, that is adjacent to the block unit, to generate a plurality of template predictions based on a plurality of intra template modes, wherein:
 each of the plurality of intra template modes indicates one of the plurality of intra candidate modes and one of a plurality of template reference lines, and
 the plurality of template reference lines includes at least one template neighboring line nonadjacent to the at least one template region;
determine a plurality of template cost values, each of the plurality of template cost values comprising a template cost value between the at least one template region and a corresponding one of the plurality of template predictions;
determine, for the block unit, a second mode list based on the plurality of template cost values; and
reconstruct the block unit based on the second mode list, wherein:
 a template prediction mode is determined, based on a template mode index included in the video data, from the second mode list to reconstruct the block unit,
 the template prediction mode indicates a specific one of the plurality of intra candidate modes and a specific one of the plurality of template reference lines selected for the block unit,
 the specific one of the plurality of template reference lines is selected based on a reference line index of the block unit included in the video data, and
 the specific one of the plurality of intra candidate modes is determined, based on the template mode index, from the second mode list after determining the specific one of the plurality of template reference lines.

11. The electronic device according to claim 10, wherein determining, for the block unit, the first mode list comprises:
determining a plurality of neighboring blocks neighboring the block unit;
determining at least one intra neighboring mode of the plurality of neighboring blocks, wherein each of the plurality of neighboring blocks is reconstructed based on one of the at least one intra neighboring mode; and
selecting the plurality of intra candidate modes from the plurality of intra default modes based on the at least one intra neighboring mode to generate the first mode list of the block unit.

12. The electronic device according to claim 10, wherein the at least one template region comprises at least one of an above template located above the block unit, a left template located at a left side of the block unit, or an above-left template located at a top-left side of the block unit.

13. The electronic device according to claim 10, wherein the plurality of template reference lines further comprises a template adjacent line adjacent to the at least one template region.

14. The electronic device according to claim 10, wherein determining, for the block unit, the second mode list comprises:
determining an arrangement of the plurality of intra template modes based on the plurality of template cost values; and
determining the second mode list based on the arrangement.

15. The electronic device according to claim 14, wherein the arrangement is generated by ordering the plurality of intra template modes in an ascending order of the plurality of template cost values.

16. The electronic device according to claim 14, wherein:
the second mode list comprises a first K candidate modes of the plurality of intra candidate modes ordered based on the arrangement, and
K is a positive integer less than a number of the plurality of intra candidate modes in the first mode list.

* * * * *